United States Patent [19]

Simon

[11] 4,343,087
[45] Aug. 10, 1982

[54] PATTERN CUTTING APPARATUS

[76] Inventor: Wayne E. Simon, P.O. Box 125, Evergreen, Colo. 80451

[21] Appl. No.: 227,513

[22] Filed: Jan. 22, 1981

[51] Int. Cl.³ .................................................. B26B 15/00
[52] U.S. Cl. ............................................. 30/241; 30/258
[58] Field of Search ................ 30/241, 242, 243, 258, 30/228, 272 A, 122, 247

[56] References Cited

U.S. PATENT DOCUMENTS

| | | | |
|---|---|---|---|
| 2,220,223 | 11/1940 | Eerhard | 30/258 |
| 2,307,424 | 1/1943 | Savage | 30/272 A |
| 2,348,876 | 5/1944 | Beard | 30/258 X |
| 2,740,197 | 4/1956 | Padva | 30/228 |
| 2,810,956 | 10/1957 | Buchanan | 30/258 X |
| 2,827,696 | 3/1958 | Yermish | 30/228 |
| 3,261,096 | 7/1966 | Klenk | 30/242 |

*Primary Examiner*—Jimmy C. Peters
*Attorney, Agent, or Firm*—John E. Reilly

[57] ABSTRACT

A powered pattern cutter particularly adaptable for use in cutting paper is made up of an anvil which is slotted on its outer periphery to receive a blade member, the latter being angled toward the center of the anvil, and the anvil being oscillated in a direction to force the paper between the edges of the slot in the blade so as to shear off a selected width of the paper as the paper is fed across the blade.

14 Claims, 4 Drawing Figures

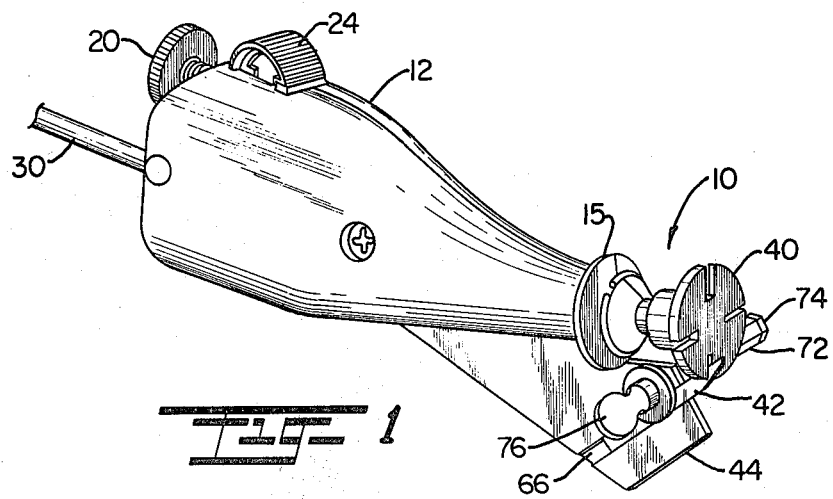
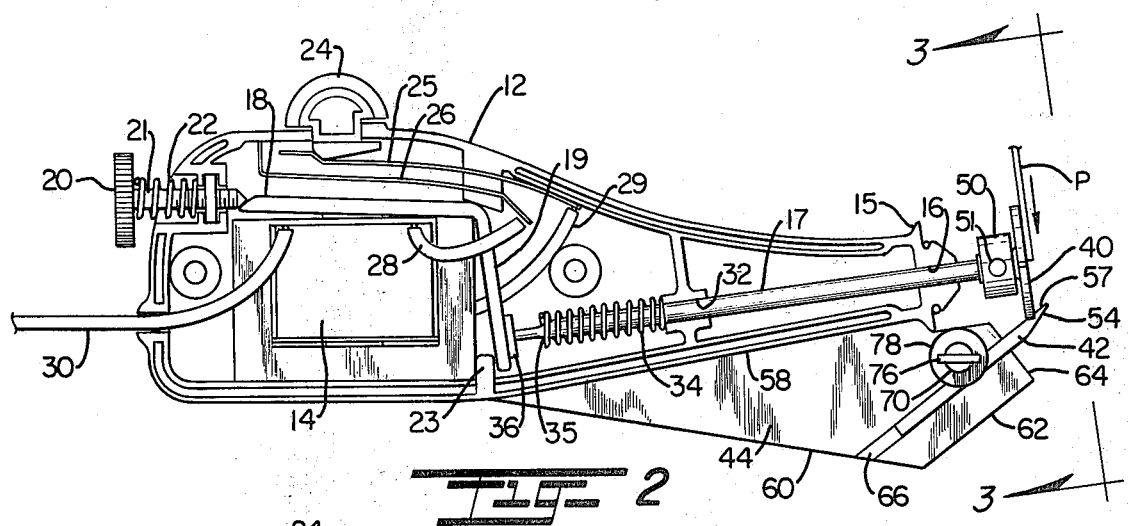
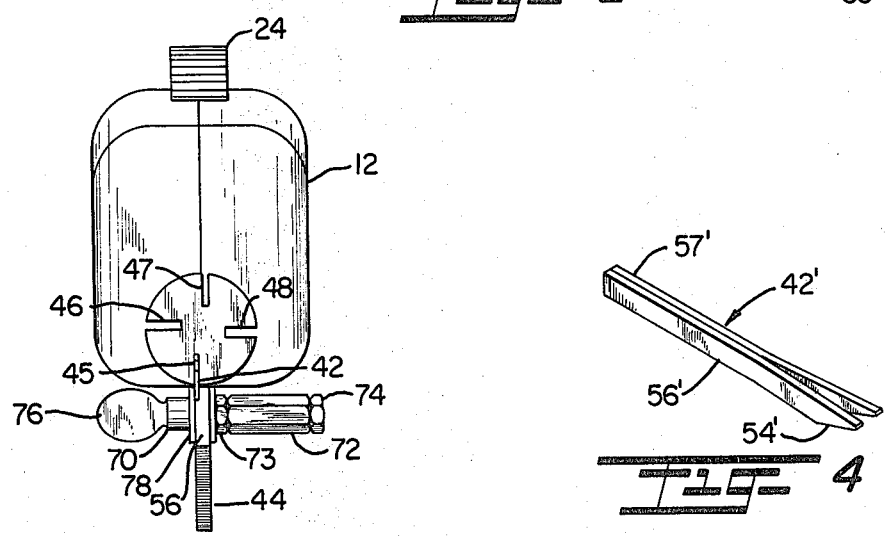

PATTERN CUTTING APPARATUS

This invention relates to cutting tools, and more particularly relates to a novel and improved paper cutting apparatus adapted for cutting patterns in paper or paper-like material in an accurate and dependable manner.

BACKGROUND AND FIELD OF THE INVENTION

Conventional paper cutting operations utilize scissors or scissor-like tools in cutting the paper along a desired path. Although such operations are satisfactory merely for the purpose of cutting along a particular path, many operations require removal of a predetermined width of paper, such as, for instance, in forming a pattern for the making of stained glass. In this particular craft, the stained glass is characterized by being formed in sections of different colors or hues and divided by a leaded border. It is a requisite in forming patterns for this purpose that the cut edge of the pattern be smooth and sharp, and the cutter should be capable of negotiating sharp curves as well as corners while performing a continuous cut. Moreover, it is desirable that the cutter is easily carried in the hand while being powered and afford good visibility to the operator so that the cutting can proceed both rapidly and accurately with no danger to the operator and with a minimum of effort.

In order to form a smooth, sharp edge, it has been found that a shearing process is most effective since other cutting processes and techniques do not result in smooth, sharp edges, especially where a predetermined width must be removed from the paper. The utilization of hinged scissors, either manual or powered, also have not been satisfactory from the standpoint of negotiating sharp curves and corners. At the same time it is important that the unit be powered yet lightweight and easily grasped so as to minimize the cutting effort while attaining greatly increased cutting speeds.

SUMMARY OF THE INVENTION

It is therefore an object of the present invention to provide a novel and improved cutting apparatus and specifically a pattern cutting apparatus capable of cutting smooth, sharp edges in removing predetermined widths of material from a pattern.

Another object of the present invention is to provide for a novel and improved pattern cutter which is capable of negotiating sharp curves and corners while performing a continuous cut.

A further object of the present invention is to provide for a novel and improved pattern cutter which is powered yet sufficiently lightweight as to be carried in the hand and permit accurate cutting along predetermined patterns rapidly and accurately while affording good visibility of the work.

It is a still further object of the present invention to provide for a novel and improved pattern cutter which is compact, efficient, economical to manufacture, reliable and safe to use in operation.

In accordance with the present invention, a pattern cutter has been devised which is broadly comprised of an anvil provided with at least one open slot on its periphery which extends in a direction toward the center of the anvil, a blade mounted in a fixed position for forward extension through the anvil slot and at an angle toward the center axis of the anvil, and a handle which supports the anvil contains drive means for reciprocating the anvil toward and away from the blade as the paper to be cut is advanced across the front face of the anvil into the blade. Shearing of the paper will occur at the intersection of the blade edges with the side edges of the slot so as to form a cut of predetermined width out of the paper.

In its preferred form, the anvil is in the form of a disk having a plurality of slots at circumferentially spaced intervals around its periphery, the slots being of different widths to accept blades of varying thicknesses. The anvil is mounted on a central drive shaft extending from the handle and from the opposite side of a motor drive which is mounted within the handle to oscillate the drive shaft and anvil at a high rate of speed. The paper feed path is established along the front surface of the anvil perpendicular to the blade so that oscillation of the anvil will occur in a direction perpendicular to the plane or path of travel of the paper and force it rapidly against the angled cutting edges of the blade. A modified form of blade has a split end which will accommodate itself to slots of different widths.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 1 is a perspective view of a preferred form of hand-held pattern cutter apparatus in accordance with the present invention;

FIG. 2 is a side view with a portion of the housing broken away to illustrate the mounting of the blade and anvil with respect to the handle;

FIG. 3 is a front end view of the preferred form of present invention; and

FIG. 4 is an end view of a blade.

DETAILED DESCRIPTION OF THE PREFERRED EMBODIMENT

Referring in detail to the drawings, there is shown in FIGS. 1 to 3 a preferred form of cutting apparatus 10 which is broadly comprised of a handle 12 which also defines a housing for a drive mechanism in the form of a solenoid 14. The housing 12 is generally rectangular in cross-section and, as best seen from FIG. 3, tapers forwardly from an enlarged portion which houses the motor into a rounded nose 15, the nose provided with a central bore or passage 16 extending lengthwise of the handle for insertion of a drive shaft 17. The solenoid 14 is operative to vibrate an oscillator plate 18 which is provided with an angled extension plate 19, the extension being formed at just less than a 90° angle to the oscillator plate and extending across the front surface of the motor but at a slight angle thereto, and its lower end rests against a stop or projection 23 formed in the housing 12. A stroke adjustment member 20 is provided in the rear end of the housing and includes a stem 21 which is springloaded by a coil spring 22 with the leading end of the stem engageable with the rearward edge of the plate 18 so as to serve as an adjustable control for the stroke or extent of oscillation of the angle extension 19. An on-off switch 24 is positioned on one side of the housing and bears against a contact or a switch arm 25 which is normally spaced from another switch arm 26 to make or break the circuit for operation of the motor. Electrical leads 28 and 29 extend between the contact arms 25 and 26 for connection to the solenoid, and a power cord 30 energizes the solenoid when the contact arms are closed by the on-off switch 24.

The drive shaft 17 is of elongated, generally cylindrical configuration and is dimensioned to be of a length to extend between the plate 19 through the nose portion 15 and is suitably supported in a bearing sleeve 32 at an intermediate point along the shaft. A coil spring 34 is mounted under compression between the end of the bearing sleeve 32 and a spring stop 35 so as to yieldingly urge the shaft 17 against an enlarged pad or button 36 on the extension plate 19.

The oscillating mechanism as hereinbefore described is intended to serve more as a setting for the novel features of the present invention and, of itself, is of conventional construction. For example, the tool may be a Model 21 Engraver, manufactured and sold by Wen Products Co. of Chicago, Ill. It is sufficient for the purpose of the present invention to recognize that the tool as described repetitively engages and deenergizes the solenoid 14 so as to cause rapid movement or oscillation of the plate and attached extension plate 19 so as to impart an axial or linear, high speed reciprocation to the shaft.

An important feature of the present invention resides in the relative disposition and mounting of a disk-shaped anvil 40 for oscillation at the leading end of the shaft 17 with respect to a fixed blade 42 which is supported on a blade holder 44. The anvil 40 is of circular configuration, as shown in FIG. 3, and is provided with a plurality of slots 45, 46, 47 and 48 at spaced circumferential intervals about its periphery. Each slot 45–48 is an open slot extending radially inwardly toward the center of the anvil from the periphery and is of a corresponding depth but has a different width. A collar 50 is affixed to the rear face of the anvil and provided with an opening which is adapted for insertion of the leading end of the shaft 17, and a lock screw 51 on the collar serves to fix the anvil securely to the shaft for oscillatory movement with the shaft.

Various types of blade holders may be employed to suitably mount the blade 42 with respect to the anvil such that the blade 42 extends forwardly through the outermost open end of a slot 45 and projects a slight distance beyond the slot. The blade 42 is mounted preferably at an acute angle on the order of 45° to the longitudinal axis of the shaft 17 and of the anvil itself, and the blade is of a narrow, thin elongated configuration being generally rectangular cross-section and terminating in a tapered leading or forward end 54. The blade is of uniform thickness throughout and with opposite sides 56 across the lesser dimension or thickness of the blade terminating in opposed edges 57, the intersection of the sides 56 with the edges 57 defining the squared cutting edges of the blade.

The preferred form of blade holder 44 is of generally triangular configuration and has a longer connecting edge 58 permanently affixed along its length to a flat surface of the handle 12 and with a forward projection 59 of the inner connecting edge 57 extending to a point terminating adjacent to the locking screw 70. A first inclined edge 60 diverges forwardly from the rearward end of the connecting edge 58 and intersects an oppositely inclined edge 62, the inclined edge 62 terminating in a leading edge 64 which extends perpendicular to the inclined edge 62 and is located directly behind the anvil 65 so as not to interfere with its oscillatory movement. A groove 66 is formed in one side of the blade holder 44 and is inclined at an angle to establish the desired angularity of the blade 42 with respect to the anvil. To this end, the groove 66 extends at an acute angle to the longitudinal axis of the shaft 17 and anvil 40 and extends in closely-spaced relation to the inclined edge 62 so as to terminate at the leading edge 64 of the blade holder. The groove is dimensioned for close-fitting insertion of the blade 42 and such that the wider dimension of the blade extends between the sides of the groove, and the lesser dimension or thickness of the blade is such that one side 56 will protrude outwardly a slight extent from the groove, as illustrated in FIG. 3.

The blade is releasably clamped in the groove by means of a locking screw 70 which extends through a bore in the blade holder 44 and is threaded into a threaded sleeve 72 which is provided with lock nuts 73 and 74 at opposite ends. A wing nut 76 is threaded onto the exposed end of the screw 70 which projects through the blade holder, and a washer 78 is mounted on the screw between the wing nut 76 and surface of the blade holder 44 so as to be clamped firmly against the external side surface 56 of the blade 42 when the blade is inserted into the groove 66. In this way, the blade 42 may be releasably inserted lengthwise through the groove 66 beneath the washer 78 and set precisely in desired relation to the anvil as described with the forward end 54 projecting through a slot 45 and projecting slightly beyond the front face of the anvil 40.

In practice, the paper to be cut, as represented at P in FIG. 2, is advanced in a direction parallel to the plane of the anvil and across the front face of the anvil toward the leading edge 54 of the blade. The paper will therefore approach the blade at an angle on the order of 45°; and as it moves into contact with the blade 42 the rapid oscillation of the anvil 40 will cause the paper, on the forward stroke of the anvil 40, to be sheared across the cutting edges of the blade so as to remove a predetermined width of paper. The width of the paper removed will of course depend on the width of the slot but in any event the paper can be advanced continuously since the speed of oscillation of the anvil is such as to impart a continuous shearing action to the paper as it is advanced across the blade. For the purpose of illustration, the Model 21 Engraver referred to earlier is capable of oscillating the anvil 40 at the rate of 120 oscillations per second, the stroke of the anvil being on the order of 0.005". In this relation, the edges of the slot will cooperate somewhat with the cutting edges of the blade in severing the paper.

In handling of larger patterns or sizes of paper, and particularly where it is necessary to view the precise pattern of cut and to follow guidelines marked on the paper P, most desirably the tool 10 is disposed in upstanding relation with the anvil facing in an upward direction and being disposed in a horizontal plane. In this way, the paper can be advanced horizontally across the anvil directly beneath the eye of the operator and the paper can be manipulated or turned in any desired direction as it is advanced across the blade. As stated earlier, most desirably the anvil is provided with slots 45 to 48, each of which is of a different width. Generally, the two layers of the blade may vary from 0.010" to 0.015" in thickness, and the width of the slots may vary from 0.032" to 0.078". It has been found that blades of different desired widths may be easily formed simply by laminating together the desired number of blades, such as, by welding together. Two 0.012" layers are laminated together, as shown in FIG. 4, with sides 56' adjoining or affixed to one another. However, the blade is modified in FIG. 4 in that the leading edges 54' of the blade are split and sprung or flared apart to a spacing of approximately ⅛". In the modified form, the blade cuts efficiently in desired different widths due to the spring tension exerted against the edge of the slot by the leading ends 54'. The releasable clamping screw 70 as described will accommodate increases in thickness of the blade, and the corresponding slot 45 to 48 for a given width blade is advanced into position simply by rotating the anvil 40 to advance the desired slot into alignment with the blade 42. However, in the modified form of blade shown in FIG. 4, the leading end of the blade is flared apart to provide efficient cutting in slots of various widths.

As illustrated in FIG. 2, the straight edge 57 of the blade is disposed in facing relation to the path of paper advancement. In cutting certain grades of paper, such as, thicker paper stock it is advantageous to increase the angle of the blade to the anvil 40. To this end, the blade 42 is reversed to position the inclined edge 54 as the cutting edge in the path of paper movement so that, for example, the cutting angle is increased from 45° to 65°. The cutting rate, or rate of advancement, of the paper P would also be reduced somewhat as the cutting angle is increased as described.

It is therefore to be understood that various modifications and changes may be made in the specific construction and arrangement of parts comprising the preferred form of pattern cutting apparatus without departing from the spirit and scope of the present invention as defined by the appended claims.

I claim:

1. Cutting apparatus adapted for cutting patterns in paper and the like, comprising:
   a handle;
   an anvil member provided with at least one open slot on its periphery extending in a direction toward the center of said anvil;
   a blade mounted in fixed relation to said handle for forward extension through said slot in said anvil and at an angle toward the center of said anvil; and
   drive means in said handle for reciprocating said anvil along an axis through the center of said anvil.

2. Cutting apparatus according to claim 1, said drive means including a central drive shaft extending through said handle, said anvil being mounted for oscillation at one end of said drive shaft.

3. Cutting apparatus according to claim 1, said anvil provided with a plurality of slots at circumferentially spaced intervals.

4. Cutting apparatus according to claim 3, said slots in said anvil each being of a different width.

5. Cutting apparatus according to claim 1, said blade being releasably mounted on said handle for forward extension through said open slot in said anvil, the cutting angle between said blade and said anvil being on the order of 45° to 65°.

6. Cutting apparatus according to claim 1, said blade being of narrow elongated configuration and terminating in a flared leading end portion.

7. Cutting apparatus according to claim 6, said blade having split leading ends sprung apart under spring tension against side edges of said slot.

8. Cutting apparatus according to claim 1, said blade having a plurality of cutting edges to selectively vary the cutting angle between said blade and said anvil.

9. Cutting apparatus according to claim 1, said drive means including a reciprocal drive member and means for adjusting the length of stroke of said anvil when reciprocated by said drive member.

10. A pattern cutting tool comprising:
    a handle;
    an anvil member provided with at least one open slot on its periphery extending in a direction toward the center of said anvil;
    a blade mounted in fixed relation to said handle for forward extension through said slot in said anvil and at an angle to the center of said anvil; and
    drive means in said handle for reciprocating said anvil along an axis through the center of said anvil whereby to advance said slot in a direction substantially lengthwise of said blade.

11. A pattern cutting tool according to claim 10, said drive means including a drive shaft extending through said handle, said anvil being mounted for oscillation at one end of said drive shaft and provided with a plurality of slots at circumferentially spaced intervals around its periphery.

12. A pattern cutting tool according to claim 11, each said slot being of different width.

13. A pattern cutting tool according to claim 10, said blade being releasably mounted on said handle, and said blade being of narrow elongated configuration and terminating in split leading ends, each having a squared cutting edge.

14. A pattern cutting tool according to claim 10, said drive means including an electrically powered reciprocal drive source and means for adjusting the length of stroke of said anvil when reciprocated by said drive source.

* * * * *